United States Patent
Dudragne

[11] 3,784,286
[45] Jan. 8, 1974

[54] WIDE-ANGLE OBJECTIVE LENS

[76] Inventor: Raymond Andre Dudragne, 152 Boulevard Haussmann, Paris, France

[22] Filed: May 8, 1972

[21] Appl. No.: 251,359

[30] Foreign Application Priority Data
May 7, 1971 France .................. 7116725

[52] U.S. Cl. .............. 350/220, 350/192, 350/206, 350/212
[51] Int. Cl. ............................................ G02b 9/34
[58] Field of Search ............... 350/175 E, 175 NG, 350/189, 192, 206, 212, 220, 198, 175 SL

[56] References Cited
UNITED STATES PATENTS

| 2,146,662 | 2/1939 | Albada | 350/198 X |
| 3,514,186 | 5/1970 | Poncelet | 350/175 SL UX |
| 3,158,677 | 11/1964 | Lacomme et al. | 350/192 |
| 2,377,268 | 5/1945 | Rinia | 350/189 |
| 3,514,188 | 5/1970 | Blosse et al. | 350/212 |
| 3,449,041 | 6/1969 | Jager | 350/206 X |
| 3,522,986 | 8/1970 | Hugues | 350/212 X |

*Primary Examiner*—John K. Corbin
*Attorney*—Karl W. Flocks

[57] ABSTRACT

A wide-angle objective lens which provides good definition over a field of more than 120° at an aperture greater than 1/3.5, with a diaphragm placed outside the lens, the outer lenses being made of glass and the inner ones of plastic and protected from scratching. These lenses can be produced by moulding, polymerization or shaping. Their surfaces can be aspheric. The lens power of the inner lenses is O when they are spherical. The choice of curves for the lenses allows a higher degree of correction.

4 Claims, 3 Drawing Figures

WIDE-ANGLE OBJECTIVE LENS

Many types of objective lenses have been designed and produced in order to obtain a good definition of the image over a large field. These objective lenses have one thing in common, i.e. the diaphragm divides the objective lens into two unequal parts: a group of frontal lenses situated near the object, and a group of rear lenses placed near the image. The difficulty presented in correcting the aberrations produced by a large angular field always led to the use of numerous lenses, and in particular the group of frontal lenses (with the first negative lens in the form of a half-sphere) increased in importance in order to obtain a field close to 180°.

The first essential characteristic of this objective lens is the total elimination of the frontal group, the objective lens being placed entirely behind the diaphragm. The rear lenses are placed one behind the other and occupy the space between the diaphragm and the image. This all leads to less overcrowding, not only through the elimination of the frontal group but also through the use of the entire image field.

The second characteristic of this objective lens is that it covers a field of greater than 120° with an aperture of $f/2.5$ and even $f/0.8$, while all the other lenses with frontal groups have an aperture of about $f/11$ or exceptionnally $F/4.5$.

An example of its capabilities is that it has a power of separation of 75 lines to the mm for two-thirds of the image field, using an angular field of 130°, with a diaphragm of 6 mm for a focal length of 15 mm (aperture: $f/2.5$). Moreover, plastic lenses have been tried out for use in optical systems. Their use in precision optical systems has been discouraged by two main inconveniences. First, plastics are not tough enough and their surfaces scratch easily. Secondly, it is impossible to obtain a constancy of refractive indexes with sufficient precision when there are important variations in temperature and when the lenses have a power determined for a temperature of about 20°.

According to this invention, certain transparent and dispersive plastics, such as methyl or allyl methacrylate or carbonate of allyl could be used. This would avoid the two drawbacks previously mentioned and would give, from an industrial point of view, the considerable advantage of being easily mass produced at a low cost by molding, polymerization, or shaping under heat (in these three processes, the lens is modeled on a pattern given).

This type of manufacturing allows the use of non-spheric surfaces thus lessening the number of lenses needed to correct aberrations.

In order to avoid the first of the two inconveniences cited, this invention foresees the use of plastic lenses in combination with glass ones, the plastic lenses being placed inside the lens and thus protected from dust and scratching.

In order to avoid the second inconvenience, this invention foresees the use of plastic lenses only with a lens power of 0, thus changing very little the axial power of the entire system and with a chromatism of 0. The choice of the curves for the plastic lenses then allows a correction of the remaining axial and extra-axial aberrations, the degree of these corrections being all the more greater for very large apertures if aspheric lenses are used and if the transfer function of the object is not changed.

This invention will be better understood with the help of the following description.

Figure 1:
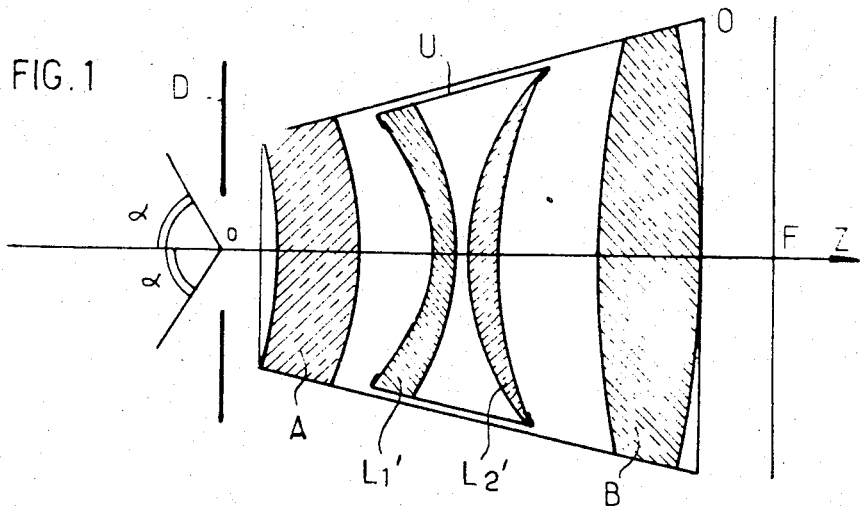
FIG. 1 represents a first embodiment of an objective lens.

On FIG. 1, O is the centre of the diaphragm D and the optical axis OZ. The objective lens is represented by a trapezoidal enveloppe corresponding to the feature that the objective lens is formed by a series of lenses increasing in size. The field 2 is greater than 120°, the focal plane of the focus F is situated close to the back of the objective lens. A and B (dotted lines) represent the glass lenses which hermetically seal the optical system U. U is made of plastic and is formed by the lenses $L_1'$ and $L_2'$ whose lens power is 0 and whose convex surfaces face each other.

Figure 2:
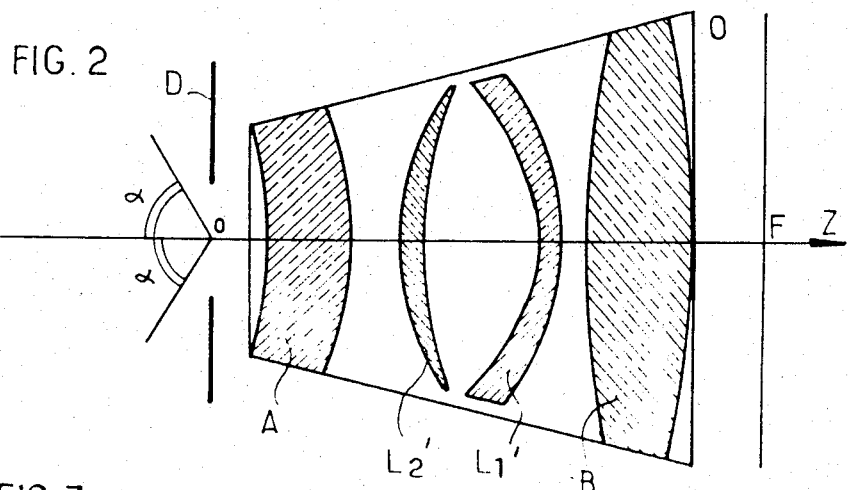
FIG. 2 represents a second embodiment of an objective lens.

FIG. 2 presents the same lay-out as diagram 1, except that the lenses $L_1'$ and $L_2'$ are reversed.

Figure 3:
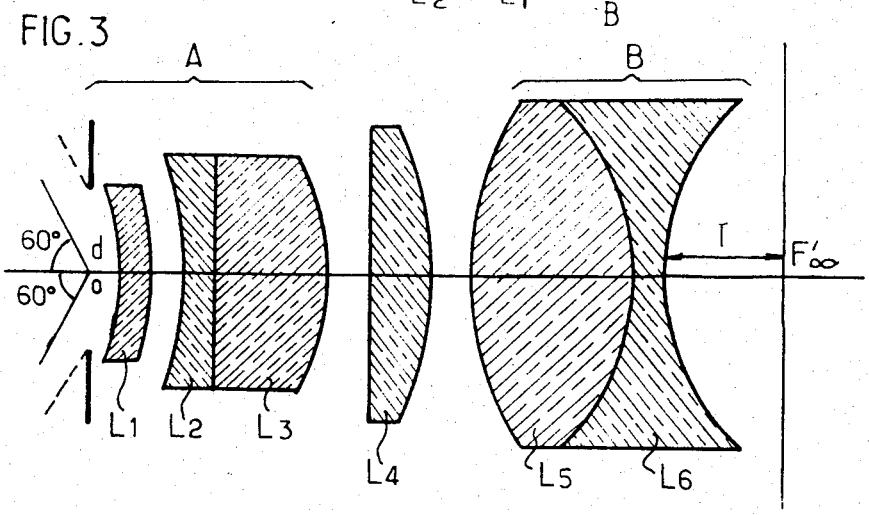
FIG. 3 represents a third embodiment of an objective lens comprising an aspheric lens.

On FIG. 3, the lenses A and B of diagrams 1 and 2 are formed by: A, lenses $L_1$, $L_2$, $L_3$ and $L_4$ which is non-spheric, can be made of glass or plastic and has a flat frontal surface, the other side being parabolic. Group A precedes group B which is formed by the lenses $L_5$ and $L_6$.

The following table gives the indexes, the radii of curvature, the thicknesses, the space between the two groups, the diameter of the lenses, all the measurements being in mm.

The objective lens has a focal length of 8 mm, an aperture of $f/2$, a field of 120°, a draw length (i.e. the distance between the output surface of the objective and the image plane: T, FIG. 3); between 3.7 and 11 mm according to the adjusting of the image plane. The plane of the diaphragm is 2 mm in front of the apex of $L_1$.

The materials chosen can have indexes ranging from 1.48 to 1.78.

TABLE

| | Indexes | Radii of curvature | | Thicknesses | Space between successive lens | Diameter |
|---|---|---|---|---|---|---|
| | | $R_1$ | $R_2$ | | | |
| $L_1$ | 1.73 | −4.1 | −4.82 | 1 | ($L_1L_2$) 0.2 | 4.0 |
| $L_2$ | 1.73 | −15.38 | ∞ | 1 | ($L_2L_3$) glued together | 6.0 |
| $L_3$ | 1.62 | ∞ | −8.71 | 4.2 | | 6.0 |
| $L_4$ | 1.49 | ∞ | −12.88 | 2.2 | ($L_3L_4$) 0.2 | 7.5 |
| $L_5$ | 1.62 | +15.3 | −10.25 | 6.0 | ($L_4L_5$) 2.2 | 9.0 |
| $L_6$ | 1.73 | −10.25 | +11.02 | 1.5 | ($L_5L_6$) glued together | 9.0 |

This invention applies essentially to photographic objectives and observation glass lenses where the wide-angle image formed by the objective lens is taken up again by the field lenses and by the usual ocular system. Since this lens has a diaphragm placed at the entry of the light into the lens, an observation glass of the type produced on a small scale creates by a particular use of this invention an observation system using a small aperture.

I claim:

1. A wide-angle objective lens system with a large aperture, said objective having a substantially plane diaphragm placed outside the lens system, the angular field being at least 80° for an aperture of at least 1/3.5, said system comprising, disposed along a common optical axis in succession behind the diaphragm, first and second groups of lenses, on opposite sides of a correcting component, said first group comprising at least first, second and third lenses, the first and second lenses being divergent whereas the third lens is convergent, and the second group being a doublet comprising a convergent lens and a divergent lens.

2. A wide-angle objective lens system as claimed in claim 1, wherein said correcting component comprises a convergent lens having an aspheric rear surface with a concavity oriented towards the diaphragm.

3. The wide-angle objective lens system as claimed in claim 1, wherein the front and rear surfaces of said first lens, at least the front surface of said second lens and at least the rear surface of said third lens of said first group, have a concavity oriented towards said diaphragm.

4. The wide-angle objective lens system as claimed in claim 3, wherein the front surface of said convergent lens of said second group and the rear surface of said divergent lens of said second group have a convexity oriented towards said diaphragm.

* * * * *